US012487382B2

(12) United States Patent
Gao et al.

(10) Patent No.: US 12,487,382 B2
(45) Date of Patent: Dec. 2, 2025

(54) WEARABLE DISPLAY DEVICE

(71) Applicant: BOE Technology Group Co., Ltd., Beijing (CN)

(72) Inventors: Jian Gao, Beijing (CN); Wenji Zhu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 793 days.

(21) Appl. No.: 17/781,911

(22) PCT Filed: May 7, 2021

(86) PCT No.: PCT/CN2021/092181
§ 371 (c)(1),
(2) Date: Jun. 2, 2022

(87) PCT Pub. No.: WO2022/077898
PCT Pub. Date: Apr. 21, 2022

(65) Prior Publication Data
US 2023/0236344 A1   Jul. 27, 2023

(30) Foreign Application Priority Data

Oct. 13, 2020   (CN) .......................... 202011089667.5

(51) Int. Cl.
*G02B 5/18* (2006.01)
*G09F 9/30* (2006.01)

(52) U.S. Cl.
CPC ............. *G02B 5/1842* (2013.01); *G02B 5/18* (2013.01); *G09F 9/30* (2013.01)

(58) Field of Classification Search
None
See application file for complete search history.

(56) References Cited

U.S. PATENT DOCUMENTS 5,943,166 A    8/1999  Hoshi et al.
2005/0259323 A1  11/2005  Fukushima et al.
(Continued)

FOREIGN PATENT DOCUMENTS

CN    1655012 A   8/2005
CN   102122077 A   7/2011
(Continued)

OTHER PUBLICATIONS

CN202011089667.5 first office action.

*Primary Examiner* — Richard H Kim
(74) *Attorney, Agent, or Firm* — IPro, PLLC

(57) ABSTRACT

Provided is a wearable display device. The wearable display device includes a display panel including a plurality of pixel island groups arranged along a first direction, wherein each of the plurality of pixel island groups includes a plurality of pixel islands arranged along a second direction, each of the plurality of pixel islands including a plurality of sub-pixels arranged along the first direction; and the second direction is intersected with the first direction; and a slit grating disposed on a light-exiting side of the display panel, wherein the slit grating includes a plurality of slits arranged along the first direction and extending along the second direction, each of the slits being configured to exit rays emitted by the sub-pixels in at least one of the plurality of pixel island groups.

15 Claims, 11 Drawing Sheets

(56) References Cited

U.S. PATENT DOCUMENTS

| | | |
|---|---|---|
| 2010/0265464 A1 | 10/2010 | Jacumet |
| 2012/0099215 A1* | 4/2012 | Wu ................ G02F 1/1335 445/24 |
| 2014/0036360 A1 | 2/2014 | Sakamoto et al. |
| 2014/0092223 A1 | 4/2014 | Lin |
| 2015/0015568 A1 | 1/2015 | Fang et al. |
| 2016/0231567 A1 | 8/2016 | Saarikko et al. |
| 2016/0232825 A1 | 8/2016 | Zhao et al. |
| 2016/0260371 A1* | 9/2016 | Wang ................ G02B 5/201 |
| 2018/0095273 A1 | 4/2018 | Jeong et al. |
| 2019/0041658 A1 | 2/2019 | Gollier et al. |
| 2020/0158944 A1 | 5/2020 | Wang et al. |
| 2021/0173222 A1 | 6/2021 | Makinen et al. |

FOREIGN PATENT DOCUMENTS

| | | |
|---|---|---|
| CN | 102928986 A | 2/2013 |
| CN | 202976704 U | 6/2013 |
| CN | 103424875 A | 12/2013 |
| CN | 103581643 A | 2/2014 |
| CN | 104297832 A | 1/2015 |
| CN | 104360489 A | 2/2015 |
| CN | 105025289 A | 11/2015 |
| CN | 106526876 A | 3/2017 |
| CN | 106681512 A | 5/2017 |
| CN | 106772737 A | 5/2017 |
| CN | 107250888 A | 10/2017 |
| CN | 207301514 U | 5/2018 |
| CN | 108307187 A | 7/2018 |
| CN | 108803060 A | 11/2018 |
| CN | 208569201 U | 3/2019 |
| CN | 110297331 A | 10/2019 |
| CN | 110401829 A | 11/2019 |
| CN | 110703456 A | 1/2020 |
| CN | 111295612 A | 6/2020 |
| EP | 3144718 A1 | 3/2017 |

* cited by examiner

WEARABLE DISPLAY DEVICE

CROSS-REFERENCE TO RELATED APPLICATION

The present disclosure is a US national stage of international application No. PCT/CN2021/092181, filed on May 7, 2021, which claims priority to Chinese Patent Application No. 202011089667.5, filed on Oct. 13, 2020 and titled "WEARABLE DISPLAY DEVICE," the contents of which are herein incorporated by references in their entireties.

TECHNICAL FIELD

The present disclosure relates to the field of virtual reality technologies, and more particularly, relates to a wearable display device.

BACKGROUND

A virtual reality (VR) device refers to a device that may create a virtual environment based on displayed images and immerse users in the virtual environment.

SUMMARY

Embodiments of the present disclosure provide a wearable display device. Technical solutions are as follows.

A wearable display device is provided. The wearable display device includes:
  a display panel including a plurality of pixel island groups arranged along a first direction, wherein each of the plurality of pixel island groups includes a plurality of pixel islands arranged along a second direction, each of the plurality of pixel islands including a plurality of sub-pixels arranged along the first direction; and the second direction is intersected with the first direction; and
  a slit grating disposed on a light-exiting side of the display panel, wherein the slit grating includes a plurality of slits arranged along the first direction and extending along the second direction, each of the slits being configured to exit rays emitted by the sub-pixels in at least one of the plurality of pixel island groups.

Optionally, a distance W between the display panel and a viewing face satisfies:

$$W \le \frac{y-g}{2\tan\left(\frac{N}{120}\right)^\circ};$$

wherein y represents a length of each of the pixel islands along the first direction, g represents a length of a non-light emitting region between two adjacent pixel island groups along the first direction, and N represents a number of sub-pixels in each of the pixel islands, the viewing face is disposed on a side, distal from the display panel, of the slit grating, and the viewing face is a face on which eyes of a user wearing the wearable display device are located.

Optionally, the distance between the display panel and the viewing face is equal to a sum of a first distance and a second distance, wherein the first distance is a distance between the slit grating and the display panel, and the second distance is a distance between the slit grating and the viewing face; and a ratio H/L of the first distance H to the second distance L satisfies:

$H/L = n*(y-g)/\varphi$, wherein n represents a refractive index of a medium between the slit grating and the display panel, and $\varphi$ represents a pupil diameter of the eyes.

Optionally, the refractive index of the medium between the slit grating and the display panel is 1, and a distance D between each two adjacent slits of the slit grating satisfies: $D = L*y/W$;
  wherein L represents the distance between the slit grating and the viewing face, y represents the length of each of the pixel islands along the first direction, and W represents the distance between the display panel and the viewing face.

Optionally, a length of each of the slits along the first direction ranges from 3 microns to 5 microns.

Optionally, for any sub-pixel in the plurality of sub-pixels, a crosstalk rate of other sub-pixels of the plurality of sub-pixels other than the any sub-pixel to the any sub-pixel is less than a crosstalk rate threshold, the crosstalk rate threshold being less than or equal to 6%.

Optionally, the second direction is perpendicular to the first direction; and boundary lines of the plurality of pixel island groups extending along the first direction are collinear, or the boundary lines of the plurality of pixel island groups extending along the first direction are not collinear.

Optionally, an orthographic projection of an axis, extending along the second direction, of the slit grating on the display panel is coincident with an axis, extending along the second direction, of the display panel.

Optionally, the number of the slits in the slit grating is greater than or equal to the number of the pixel island groups in the display panel.

Optionally, the wearable display device further includes: a protective layer;
  wherein the protective layer is disposed on the side, distal from the display panel, of the slit grating.

Optionally, the display panel further includes: a backplane; and the plurality of pixel island groups are disposed on a side, proximal to the slit grating, of the backplane.

Optionally, the wearable display device further includes: a glass substrate; wherein the glass substrate is disposed between the display panel and the slit grating.

Optionally, a thickness of the glass substrate is 500 microns.

Optionally, the wearable display device further includes: an adhesive layer;
  wherein the adhesive layer is disposed between the display panel and the glass substrate.

Optionally, a sum of thicknesses of the adhesive layer and the pixel island group ranges from 10 microns to 50 microns.

Optionally, the plurality of pixel islands include: a red pixel island, a green pixel island, and a blue pixel island;
  wherein colors of rays emitted by a plurality of sub-pixels in the red pixel island are red, colors of rays emitted by a plurality of sub-pixels in the green pixel island are green, and colors of rays emitted by a plurality of sub-pixels in the blue pixel island are blue.

BRIEF DESCRIPTION OF THE DRAWINGS

For clearer descriptions of the technical solutions in the embodiments of the present, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

For clearer description of the objects, technique solutions, and advantages of the present disclosure, the embodiments of present disclosure are described in detail hereinafter with reference to the accompanying drawings.

In the related art, an imaging face of a VR device may display an image, and a user may watch a movie or play a game through the VR device.

However, in the related art, the VR device includes one imaging face, and when the two eyes of the user focus on the imaging face, focus points of the two eyes are different points on the imaging face, resulting in poor display effect of the VR device.

Figure 1:
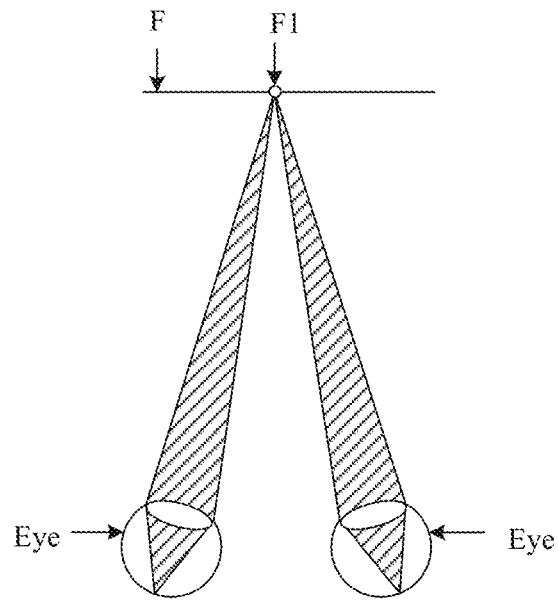
FIG. 1 is a schematic diagram of a convergence of two eyes in an actual scene according to an embodiment of the present disclosure.

In actual scenes, external scenes that the user sees are all 3-dimensional (3D) scenes, and a distance between an object focused by one eye of the user and the eye of the user may be the equal to a distance between an object focused by the other eye of the user and the eye of the user. As shown in FIG. 1, when the eyes of the user focus on a scene plane F, focus points of the two eyes are the same point F1 on the scene plane F. That is, a focusing depth of each eye may be the equal to a convergence depth of two eyes. The focusing depth of each eye refers to the distance between the object that each eye may focus on and the eye of the user, and the convergence depth of two eyes refers to a distance between a scene plane and the eyes of the user when focus points of the two eyes overlap in the scene plane.

It should be noted that the reason why the user is able to see a 3D scene in an actual scene is that the eyes of the user may focus on objects with different distances from the eyes of the user.

Figure 2:
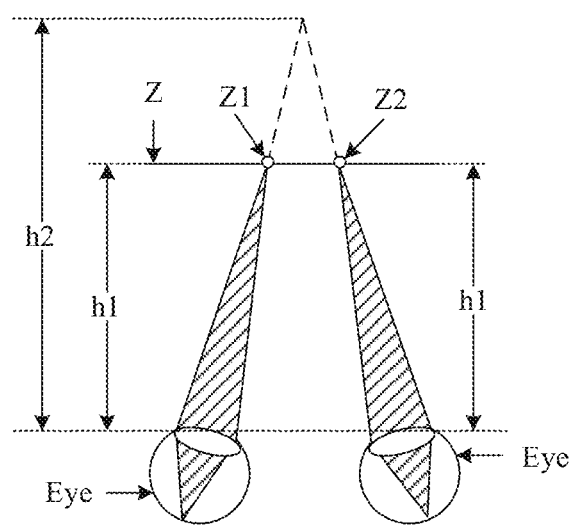
FIG. 2 is a schematic diagram of a convergence of two eyes in a wearable display device in the related art.

However, for a wearable display device, the wearable display device has an imaging face Z, and a position of the imaging face Z is usually fixed. Therefore, referring to FIG. 2, when the eyes of the user focus on the imaging face, focus points of the eyes are different points on the imaging face, i.e., Z1 and Z2. When the user wears the wearable display device, the two eyes of the user may only focus on the imaging face Z in the wearable display device, and the eyes of the user may not focus on an imaging face other than the imaging face Z by the lens focusing function of the two eyes of the user, such that the display effect of the wearable display device is poor. Moreover, referring to FIG. 2, a focusing depth h1 of each eye is different from a convergence depth h2 of two eyes, which may cause visual fatigue and dizziness of the user.

Figure 3:
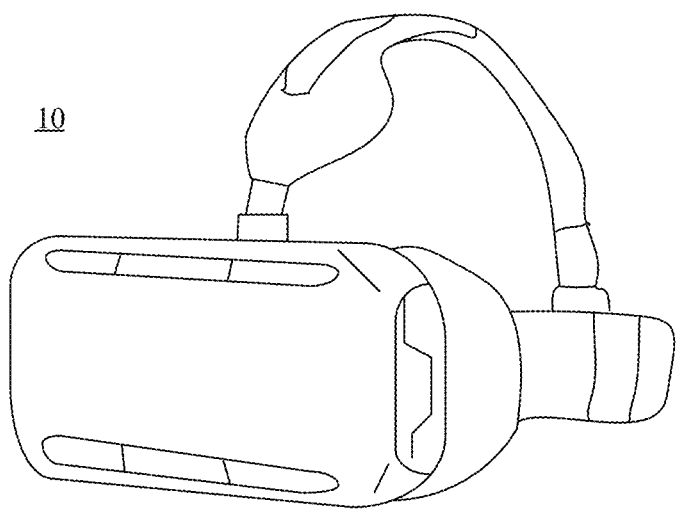
FIG. 3 is a schematic structural diagram of a wearable display device according to an embodiment of the present disclosure.

FIG. 3 is a schematic diagram of a wearable display device according to an embodiment of the present disclosure. The wearable display device 10 may be a head-mounted display device, for example, a virtual reality (VR) device or an augmented reality (AR) device.

Figure 4:
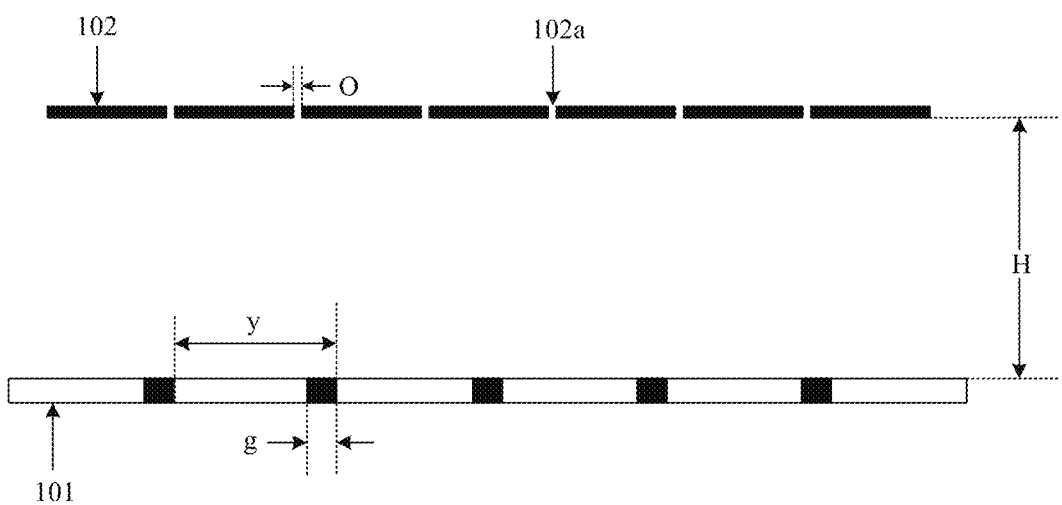
FIG. 4 is a partial schematic structural diagram of the wearable display device shown in FIG. 3.
Figure 5:
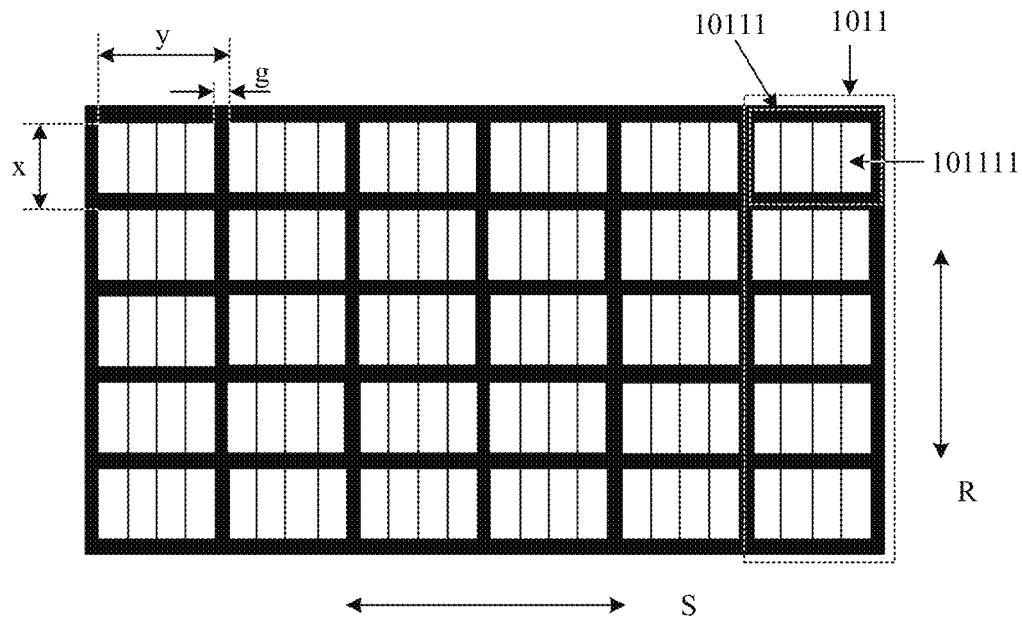
FIG. 5 is a schematic diagram of a display panel according to an embodiment of the present disclosure.

FIG. 4 is a partial schematic structural diagram of the wearable display device shown in FIG. 3. Referring to FIG. 4, it can be seen that the wearable display device 10 may include: a display panel 101 and a slit grating 102. FIG. 5 is a schematic diagram of a display panel according to an embodiment of the present disclosure. Referring to FIG. 5, it can be seen that the display panel 101 includes a plurality of pixel island groups 1011 arranged along a first direction S. Each pixel island group 1011 may include a plurality of pixel islands 10111 arranged along a second direction R, and each pixel island 10111 includes a plurality of sub-pixels 101111 arranged along the first direction S. The second direction R is intersected with the first direction S. For example, the second direction R is perpendicular to the first direction S. In addition, the first direction S may be a pixel row direction, and the second direction R may be a pixel column direction.

Figure 6:
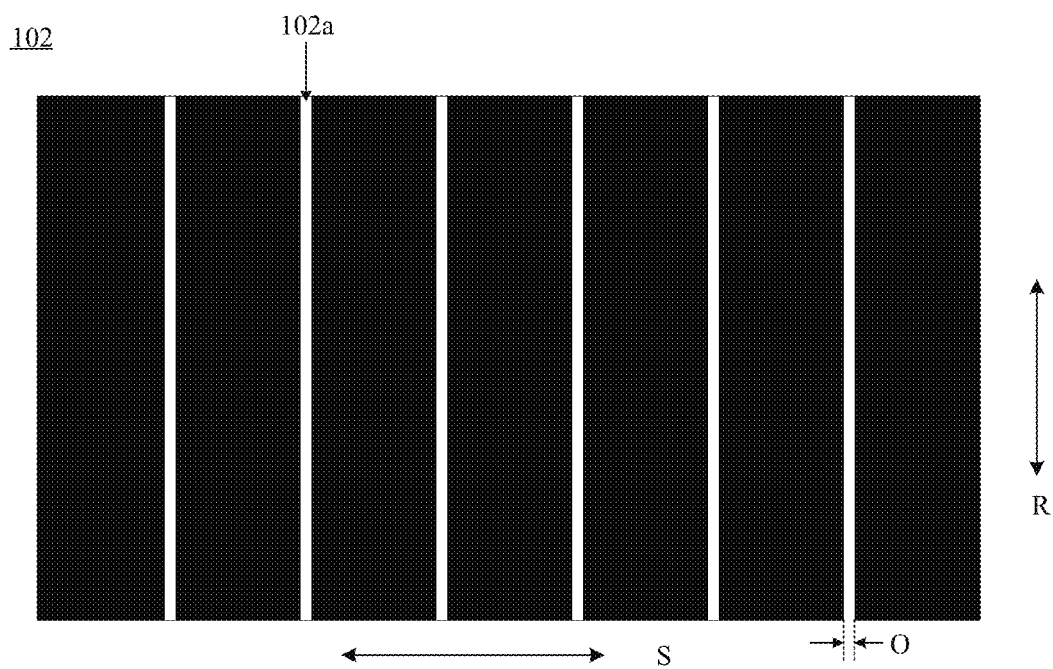
FIG. 6 is a schematic diagram of a slit grating according to an embodiment of the present disclosure.

FIG. 6 is a schematic diagram of a slit grating according to an embodiment of the present disclosure. In conjunction with FIG. 4 and FIG. 6, the slit grating 102 may be disposed on a light-exiting side of the display panel 101, and the slit grating 102 may include a plurality of slits 102a arranged along the first direction S and extending along the second direction R. Each slit 102a is configured to exit rays emitted by the sub-pixels 101111 in at least one of the pixel island groups 1011. That is, the rays emitted by the sub-pixels 101111 in the pixel island 10111 in the pixel island group 1011 may be exited from the slit 102a in the slit grating 102. In addition, after passing through the slit 102a, the rays emitted by the sub-pixels 101111 may be incident to eyes.

As a width of the slit 102a in the slit grating 102 is relatively small, distances between different sub-pixels 101111 in each pixel island group 1011 and slits 102a are different. When the rays emitted by the sub-pixels 101111 in each pixel island group 1011 is exited from one slit 102a, the rays emitted by the sub-pixels 101111 may be intersected after passing through the slit 102a. Furthermore, the plurality of sub-pixels 101111 may cause that the wearable display device 10 possesses at least two imaging faces. In this way, focus points of two eyes of the user are the same point on an imaging face of at least two imaging faces by the lens focusing function of the two eyes of the user when the two eyes of the user focus on an imaging face of the at least two imaging faces, such that visual fatigue of the user can be avoided, and a display effect of the wearable display device is great.

In summary, the embodiments of the present disclosure provide a wearable display device including a display panel, and a slit grating disposed on a light-emitting side of the display panel. The rays emitted by sub-pixels in the display panel may be exited from slits in the slit grating. In addition, as the rays emitted by the sub-pixels may be intersected after passing through the slits, the wearable display device may include at least two imaging faces. In this way, focus points of two eyes of a user are the same point on an imaging face of the at least two imaging faces by the lens focusing function of the two eyes of the user when the two eyes of the user focus on the certain imaging face of the at least two imaging faces, such that visual fatigue of the user can be avoided, and a display effect of the wearable display device is great.

Optionally, a number of the slits 102*a* in the slit grating 102 may be greater than or equal to a number of the pixel island groups 1011 in the display panel 101. For example, the number of the slits 102*a* in the slit grating 102 may be equal to the number of the pixel island groups 1011 in the display panel 101. For example, referring to FIG. 4 to FIG. 6, the display panel 101 includes six pixel island groups 1011, and the slit grating 102 includes six slits 102*a*.

In the embodiments of the present disclosure, after the ray emitted by each sub-pixel 101111 in each pixel island 10111 passes through the slit 102*a*, a direction of the ray is a fixed direction. The rays in multiple fixed directions may be referred to as a light field in space (abbreviated as a light field). In the light field, extending directions of the plurality of rays incident to the pupil need to be intersected on a side, distal from the slit grating 102, of the display panel 101, to make rays incident to the pupil image in space (that is, to make an image is displayed on an imaging face of the wearable display device). In addition, planes of a plurality of intersections with the same distance from the display panel 101 are an imaging face. In the case that a distance from some intersections to the display panel 101 is different from a distance from other intersections to the display panel 102, the wearable display device 10 includes at least two imaging faces.

When the pixel island 10111 includes more sub-pixels 101111, extending directions of the plurality of rays incident to the pupil possess more intersections on the side, distal from the slit grating 102, of the display panel 101. Therefore, for more intersections and different distances from the intersections to the display panel 101(that is, the wearable display device 10 includes at least two imaging faces), the pixel island 10111 needs to be configured to cause that the rays emitted by at least two adjacent sub-pixels 101111 are incident to the same eye of the user after the rays pass through the slit 102*a*. For this purpose, each pixel island 10111 needs to include at least two sub-pixels 101111.

Figure 7:
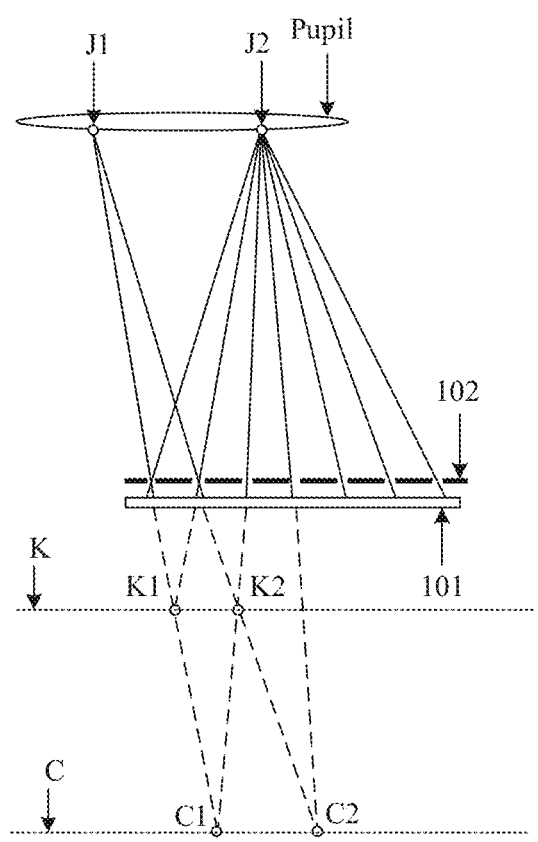
FIG. 7 is a schematic diagram of a plurality of rays incident to a pupil according to an embodiment of the present disclosure.

FIG. 7 shows four intersections, and a distance from a first type of intersections (K1 and K2) to the display panel 101 is smaller than a distance from a second type of intersections (C1 and C2) to the display panel 101. A plane of the first type of intersections (K1 and K2) is an imaging face K, and a plane of the second type of intersections (C1 and C2) is an imaging face C. As FIG. 7 only schematically shows the rays emitted by part of the sub-pixels in the display panel 101, only four intersections are shown. In fact, FIG. 7 may further show more intersections in the case that the rays emitted by all the sub-pixels are shown.

Figure 8:
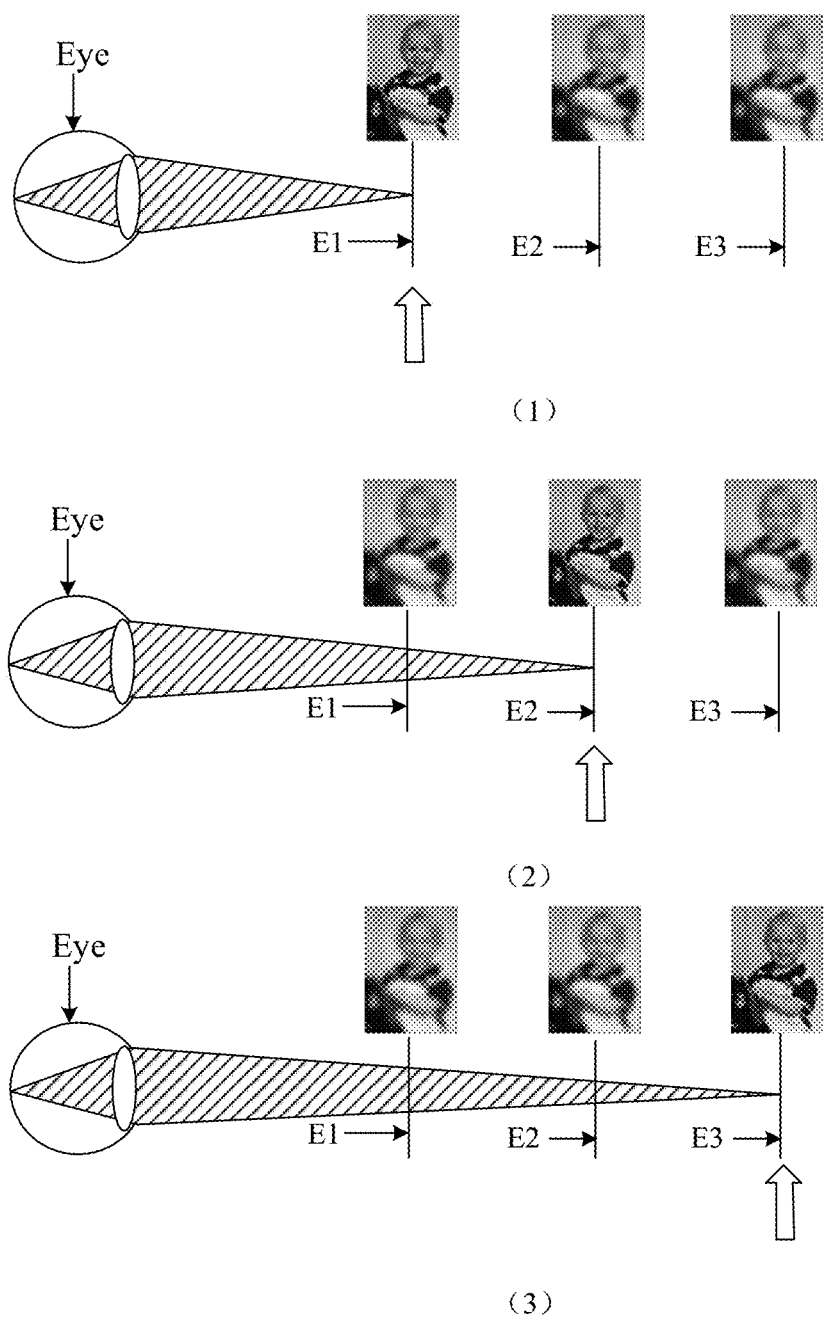
FIG. 8 is a schematic diagram of a convergence of two eyes in a wearable display device according to an embodiment of the present disclosure.

For example, referring to FIG. 8, assuming that the wearable display device includes 3 imaging faces. For (1) in FIG. 8, two eyes of the user focus on a first imaging face E1 by the lens focusing function of the two eyes of the user. For (2) in FIG. 8, two eyes of the user focus on a second imaging face E2 by the lens focusing function of the two eyes of the user. For (3) in FIG. 8, two eyes of the user focus on a third imaging face E3 by the lens focusing function of the two eyes of the user. That is, when viewing an image by the wearable display device 10 according to the embodiments of the present disclosure, two eyes of the user may focus on any imaging face by the lens focusing function of the two eyes of the user. That is, it may be ensured that a focusing depth of each eye of the user is equal to a convergence depth of the two eyes of the user, so as to avoid visual fatigue of the user.

Optionally, after the plurality of rays emitted by the pixel island 10111 pass through the slit grating 102, the number of focus points of the plurality of rays emitted by the pixel island 10111 that focus on the eyes may be equal to the number of sub-pixels 101111 in the pixel island 10111. For example, in FIG. 7, the plurality of rays emitted by the pixel island 10111 focus on two focus points (J1 and J2) at the eyes after passing through the slit grating 102, that is, the pixel island 10111 in the display panel 101 in FIG. 7 includes two sub-pixels 101111.

Figure 9:
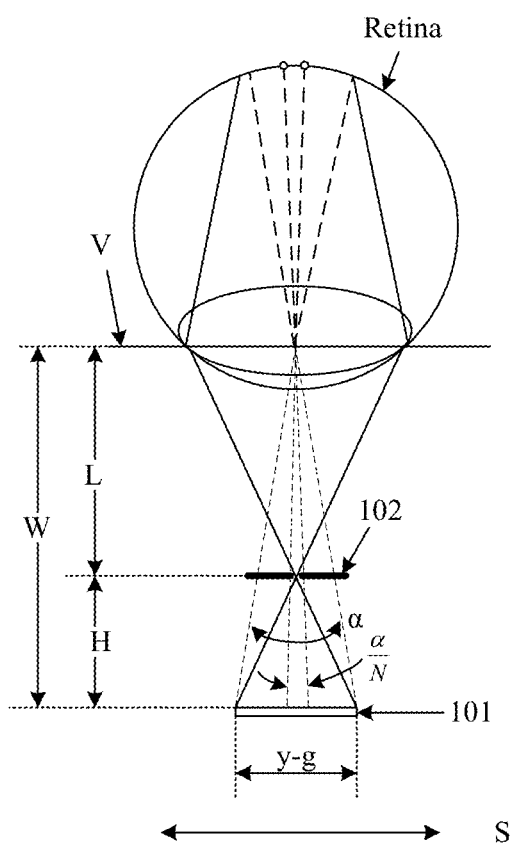
FIG. 9 is a schematic diagram of a display panel and slit grating according to an embodiment of the present disclosure.

In the embodiments of the present disclosure, referring to FIG. 9, in order to identify, by the user, the rays emitted by the sub-pixels 101111 in each pixel island 10111 (that is, the rays incident to the retinas of the eyes that are emitted by the sub-pixels 101111 in each pixel island 10111 are not located at the same cone cell on the retina), it is necessary that an included angle α/N between connecting lines of two dividing lines of a display area of each sub-pixel 101111 along the first direction S and the center of the pupil of the eye is larger than or equal to a limit resolution angle of the eye, wherein α represents an included angle between connecting lines of two dividing lines of a display area of each pixel island 1011 along the first direction S and the center of the pupil of the human eye, and N represents the number of sub-pixels in each pixel island 1011, N being an integer greater than 1. The limit resolution angle of the eye is 1 minute ('). That is, α/N≥1'.

Referring to FIG. 9, it can be seen that, $$\tan\frac{\alpha}{2} = \frac{y-g}{2 \times W},$$

from which the follows may be acquired:

$$\alpha = 2\arctan\frac{y-g}{2 \times W}. \qquad \text{formula (1)}$$

y represents a length of each pixel island 10111 along the first direction S, g represents a length of a non-light emitting region between two adjacent pixel island groups 1011 along the first direction S, and W represents a distance between the display panel 101 and the viewing face V. The viewing face V may be disposed on a side, distal from the display panel 101, of the slit grating 102, and the viewing face V may be a face of the eyes of the user wearing the wearable display device.

As an unit of the included angle α calculated by the formula (1) is degree (°), in order to facilitate the calculation of the distance W between the display panel 101 and the viewing face V based on α/N≥1', α/N≥1' may be converted into:

$$\alpha/N \geq (1/60)° \qquad \text{Formula (2)}.$$

When the formula (2) is combined with the formula (1), the distance W between the display panel 101 and the viewing face V satisfies.

$$W \leq \frac{y-g}{2\tan\left(\frac{N}{120}\right)°}. \qquad \text{Formula (3)}$$

In normal circumstances, in order to facilitate the use of the wearable display device by the user, the distance W between the display panel 101 and the viewing face V should not be too small. Therefore, in the embodiments of the present disclosure, the distance W between the display panel 101 and the viewing face V may be the maximum value within the range defined by the formula (3), that is, the distance W may satisfy:

$$W = \frac{y-g}{2\tan\left(\frac{N}{120}\right)°}. \qquad \text{Formula (4)}$$

Referring to the formula (4), it can be seen that the distance W between the display panel 101 and the viewing face V may be positively correlated with the length y of each pixel island 10111 along the first direction S. That is, in the case that the length y of each pixel island 10111 along the first direction S is larger, the distance W between the display panel 101 and the viewing face V may be larger. In the case that the length y of each pixel island 10111 along the first direction S is smaller, the distance W between the display panel 101 and the viewing face V may be less.

In addition, the distance W between the display panel 101 and the viewing face V may be negatively correlated with the length g of the non-light emitting region between two adjacent pixel island groups 1011 along the first direction S. That is, in the case that the length g of the non-light emitting region between two adjacent pixel island groups 1011 along the first direction S is larger, the distance W between the display panel 101 and the viewing face V may be smaller. In the case that the length g of the non-light emitting region between two adjacent pixel island groups 1011 along the first direction S is smaller, the distance W between the display panel 101 and the viewing face V may be larger.

In addition, the distance W between the display panel 101 and the viewing face V may be negatively correlated with the number N of sub-pixels 101111 included in each pixel island 10111. That is, in the case that the number N of sub-pixels 101111 in each pixel island 10111 is greater, the distance W between the display panel 101 and the viewing face V may be smaller. In the case that the number N of sub-pixels 101111 in each pixel island 10111 is less, the distance W between the display panel 101 and the viewing face V may be larger.

In the embodiments of the present disclosure, the utilization rate of the rays emitted by the sub-pixels 101111 in each pixel island 10111 is improved, and the crosstalk between the rays emitted by the pixel islands 10111 is reduced, such that the ray emitted by each pixel island 10111 is coincident with the pupil after passing through the slit. Therefore, referring to FIG. 10, according to the triangle similarity theorem, the follows may be acquired:

$$\frac{y-g}{\varphi} = \frac{H}{L}. \qquad \text{Formula (5)}$$

Figure 10:
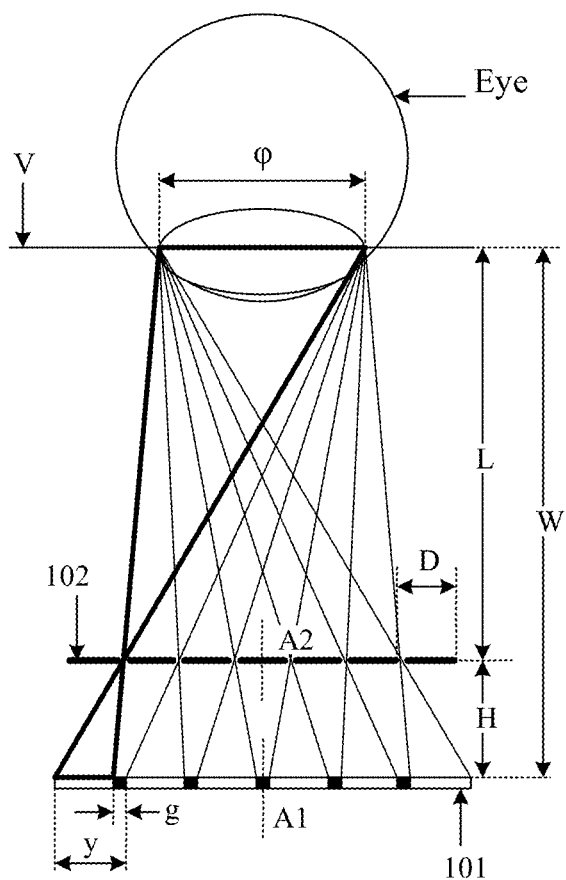
FIG. 10 is a schematic diagram of another display panel and slit grating according to an embodiment of the present disclosure.

Referring to FIG. 9 and FIG. 10, the distance W between the display panel 101 and the viewing face V may be equal to a sum of a first distance H and a second distance L, that is, W is equal to H plus L. The first distance H may be a distance between the slit grating 102 and the display panel 101, and the second distance L may be a distance between the slit grating 102 and the viewing face V. Referring to formula (5), a ratio of the first distance H to the second distance L may be positively correlated with the length y of each pixel island 10111 along the first direction S, may be negatively correlated with the length g of the non-light emitting region between two adjacent pixel island groups 1011 along the first direction S. and may be negatively correlated with the pupil diameter φ of the eye.

As the length y of each pixel island 10111 in the display panel 101 along the first direction S, the length g of the non-light emitting region between two adjacent pixel island groups 1011 along the first direction S, the number N of sub-pixels 101111 in each pixel island 10111, and the pupil diameter φ of the eye may all be known values, the first distance H and the second distance L may be calculated based on the formula (4) and formula (5).

As an example, assuming that the length y of each pixel island 10111 along the first direction S is 54.9 microns (μm), the length g of the non-light emitting region between two adjacent pixel island groups 1011 along the first direction S is 20 μm, the number N of sub-pixels 101111 in each pixel island 10111 is 4, and the pupil diameter φ of the eye ranges from 3 millimeters (mm) to 5 mm (for example, the pupil diameter φ of the eye is 3 mm), the first distance H is calculated as 366.67 μm, and the second distance L is calculated as 29.628 mm based on the formula (4) and formula (5).

The refractive index between the display panel 101 and the slit grating 102 is not considered when the first distance H is calculated based on the formula (5). That is, when a default medium between the display panel 101 and the slit grating 102 is air (the refractive index n of air is equal to 1), the first distance H may be 366.67 μm.

Figure 11:
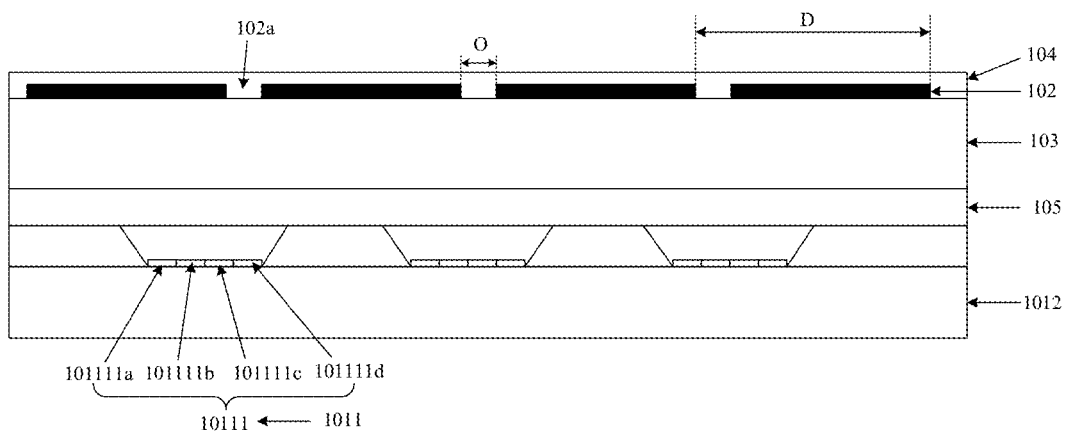
FIG. 11 is a schematic diagram of another wearable display device according to an embodiment of the present disclosure.

However, referring to FIG. 11, in order to fix the display panel 101 and the slit grating 102, the wearable display device 10 may further include: a glass substrate 103. The glass substrate 103 may be disposed between the display panel 101 and the slit grating 102. Therefore, in the embodiments of the present disclosure, considering the effect of the refractive index of the glass substrate 103 on the first distance H, the formula (5) may be converted into:

$$\frac{(y-g) \times n}{\varphi} = \frac{H}{L}. \qquad \text{Formula (6)}$$

For example, in the case that the wearable display device 10 includes the glass substrate 103 disposed between the display panel 101 and the slit grating 102, and the refractive index of the glass substrate 103 is 1.5, the first distance H is calculated as 550 µm based on the formula (4) and formula (6). Optionally, a thickness of the glass substrate 103 may be 500 µm.

In the embodiments of the present disclosure, in order to identify, by the user, the rays emitted by the pixel islands 10111 through the slit 102a, that is, for a purpose that the ray emitted by each pixel island 10111 may be incident to the eyes after passing through the slit 102a, it is necessary to shorten the distance D between each two adjacent slits 102a in the slit grating with respect to the length y of each pixel island 10111 along the first direction S. Referring to FIG. 10, according to the triangle similarity theorem, the distance D between each two adjacent slits 102a in the slit grating 102 may satisfy:

$$\frac{D}{y} = \frac{L}{W}. \qquad \text{Formula (7)}$$

Referring to the formula (7), it can be seen that the distance D between each two adjacent slits 102a in the slit grating 102 may be positively correlated with the length y of each pixel island 10111 along the first direction S and the distance L between the slit grating 102 and the viewing face V. and may be negatively correlated with the distance W between the display panel 101 and the viewing face V.

In the embodiments of the present disclosure, the distance W between the display panel 101 and the viewing face V in the formula (7) is acquired in the case that the refractive index of the medium between the display panel 101 and the slit grating 102 is 1. That is, the distance W between the display panel 101 and the viewing face V in the formula (7) is calculated based on the formula (4) and the formula (5).

For example, in the case that the length y of each pixel island 10111 along the first direction S is 54.9 µm, the distance L between the slit grating 102 and the viewing face V is 29.628 mm, and the distance H between the slit grating 102 and the display panel 101 is 366.67 µm, the distance W between the display panel 101 and the viewing face V is: W=L+H=29.628 mm+366.67 µm=29.99467 mm. Therefore, based on the formula (7), the distance D between each two adjacent slits 102a in the slit grating 102 is 54.229 µm.

Optionally, the dimensions of the slit grating 102 and the display panel 101 may be designed to ensure that an orthographic projection of an axis, extending along the second direction R, of the slit grating 102 on the display panel 101 is coincident with an axis, extending along the second direction R. of the display panel 101, such that the rays emitted by the pixel islands 10111 may be incident to the eyes, and the display effect of the wearable display device is ensured.

As the orthographic projection of the axis, extending along the second direction R. of the slit grating 102 on the display panel 101 is coincident with the axis, extending along the second direction R, of the display panel 101, with reference to FIG. 10, the axis A1 of the display panel 101 and the axis A2 of the slit grating 102 may be collinear. Both the axis A1 and the axis A2 are perpendicular to the first direction S and the second direction R.

In the embodiments of the present disclosure, the first distance H acquired by the formula (4) and the formula (6) is a fixed value. Optionally, the distance between the display panel 101 and the slit grating 102 may further be a value approximated to the first distance H acquired by the formula (4) and the formula (6). For example, a difference value between the distance between the display panel 101 and the slit grating 102 and the first distance H acquired by the formula may be smaller than 20 µm.

The crosstalk rate between the sub-pixels 101111 in the pixel island 10111 is positively correlated with the first distance H, and the crosstalk rate is also positively correlated with a length O of each slit 102a along the first direction S (i.e., a width of the slit 102a). That is, in the case that the first distance H and the length O of each slit 102a along the first direction S are larger, the crosstalk rate between the sub-pixels 101111 is greater. In the case that the first distance H and the length O of each slit 102a along the first direction S are smaller, the crosstalk rate between the sub-pixels 101111 is less.

Therefore, in order to prevent a great crosstalk rate from affecting the display effect of the display panel 101, in the embodiments of the present disclosure, various first distances H and various lengths O of the slits 102a along the first direction S may be used to measure the crosstalk rate between the sub-pixels by software simulation. In addition, the range of the first distance H and the range of the length O of the slit 102a along the first direction S may be determined based on the first distance H and the length O of the slit 102a along the first direction S corresponding to the crosstalk rate less than the crosstalk rate threshold.

In the embodiments of the present disclosure, for any sub-pixel in the N sub-pixels 101111 in the pixel island 10111, the crosstalk rate Q of the N-1 other sub-pixels in the N sub-pixels 101111 other than the any sub-pixel to the any sub-pixel satisfies:

$$Q = \frac{\sum_{i=1}^{N-1} E_i}{E_0}. \qquad \text{Formula (8)}$$

Wherein $E_0$ represents a luminance value of any sub-pixel at the center of the any sub-pixel, and $E_i$ represents a luminance value of the $i^{th}$ other sub-pixel at the center of the any sub-pixel.

Referring to FIG. 11, assuming that each pixel island 10111 includes four sub-pixels (101111a, 101111b, 101111c, and 101111d), that is, N is equal to 4. Based on the formula (8), it may be seen that for the third sub-pixel 101111c, the crosstalk rate Q of other three sub-pixels to the third sub-pixel 101111c satisfies:

$$Q = \frac{E_1 + E_2 + E_3}{E_0}. \qquad \text{Formula (9)}$$

Figure 12:
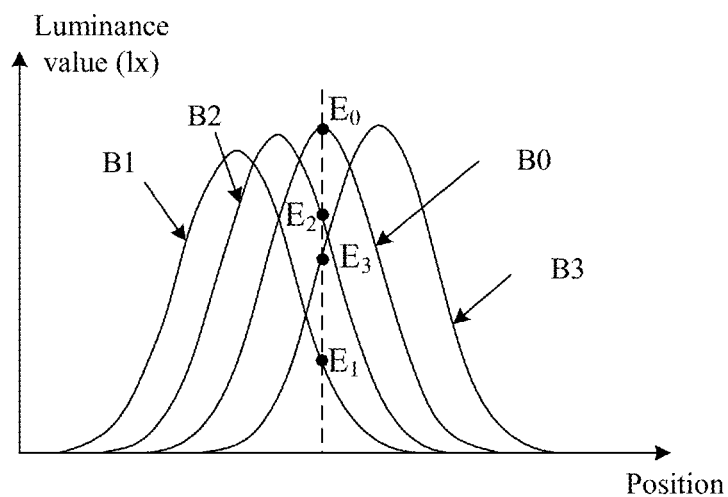
FIG. 12 is a schematic diagram of luminance curves according to an embodiment of the present disclosure.

Referring to FIG. 12, $B_0$ is a luminance curve of the third sub-pixel 101111c, and $E_0$ is a luminance value of the third sub-pixel 101111c at the center of the third sub-pixel 101111c. B1 is a luminance curve of the first sub-pixel 101111a, and $E_1$ is a luminance value of the first sub-pixel 101111a at the center of the third sub-pixel 101111c. B2 is a luminance curve of the second sub-pixel 101111b, and $E_2$ is a luminance value of the second sub-pixel 101111b at the center of the third sub-pixel 101111c. B3 is a luminance curve of the fourth sub-pixel 101111d, and $E_3$ is a luminance value the fourth sub-pixel 101111d at the center of the third sub-pixel 101111c.

Figure 13:
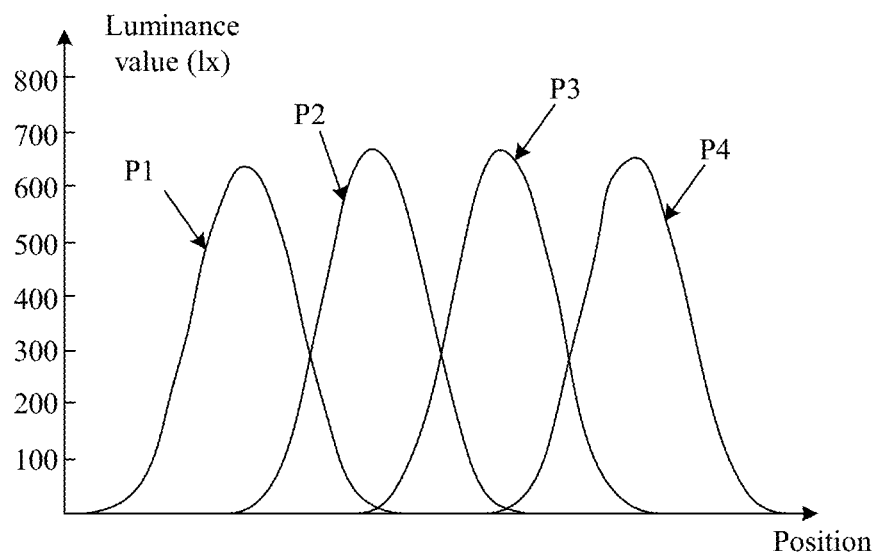
FIG. 13 is schematic diagram of another luminance curves according to an embodiment of the present disclosure.

The luminance curves shown in FIG. 12 are not the luminance curves of the sub-pixels 101111 in the display panel 101 according to the embodiments of the present disclosure, but is for the convenience of understanding of the formula (9). In the embodiments of the present disclosure, FIG. 13 is the luminance curves of the sub-pixels (P1, P2, P3 and P4). Referring to FIG. 13, the crosstalk rate between the sub-pixels in the pixel island 10111 is less, and the display effect of the display panel 101 is great.

In the embodiments of the present disclosure, referring to Table 1, assuming that the first distance H ranges from 510 µm to 590 µm, the length O of the slit 102*a* along the first direction S ranges from 3 µm to 5 µm, 20 crosstalk rates were acquired by 20 simulations. For example, referring to Table 1, in the case that the first distance H is 510 µm and the length O of the slit 102*a* along the first direction S is 3 µm, the crosstalk rate is 2.02%.

TABLE 1

| Serial number | Length of the slit along the first direction | First distance | Crosstalk rate | Width of projection of the pixel island (mm) |
|---|---|---|---|---|
| 1 | 3 µm | 510 µm | 2.02% | 2.92 |
| 2 | | 530 µm | 3.64% | 2.84 |
| 3 | | 550 µm | 4.08% | 2.76 |
| 4 | | 570 µm | 4.68% | 2.68 |
| 5 | | 590 µm | 5.32% | 2.60 |
| 6 | 4 µm | 510 µm | 3.58% | 2.92 |
| 7 | | 530 µm | 4.24% | 2.84 |
| 8 | | 550 µm | 4.62% | 2.76 |
| 9 | | 570 µm | 4.14% | 2.68 |
| 10 | | 590 µm | 6.08% | 2.60 |
| 11 | 5 µm | 510 µm | 4.32% | 2.92 |
| 12 | | 530 µm | 4.70% | 2.84 |
| 13 | | 550 µm | 5.74% | 2.76 |
| 14 | | 570 µm | 6.40% | 2.68 |
| 15 | | 590 µm | 6.70% | 2.60 |
| 16 | 6 µm | 510 µm | 5.48% | 2.92 |
| 17 | | 530 µm | 6.16% | 2.84 |
| 18 | | 550 µm | 7.08% | 2.76 |
| 19 | | 570 µm | 8.28% | 2.68 |
| 20 | | 590 µm | 9.70% | 2.60 |

In the embodiments of the present disclosure, in order to ensure the display effect of the display panel 101, for any sub-pixel in the plurality of sub-pixels, the crosstalk rate of other sub-pixels in the plurality of sub-pixels other than the any sub-pixel to the any sub-pixel is less than the crosstalk rate threshold. Optionally, the crosstalk rate threshold is less than or equal to 6%. For example, the crosstalk rate may usually be 6% as the eyes may accept the screen when the crosstalk rate is less than 6%.

For example, assuming that each pixel island includes 4 sub-pixels, that is, N is equal to 4, the crosstalk rate of the second sub-pixel, the third sub-pixel, and the fourth sub-pixel to the first sub-pixel is less than 6%, the crosstalk rate of the first sub-pixel, the third sub-pixel, and the fourth sub-pixel to the second sub-pixel is less than 6%, the crosstalk rate of the first sub-pixel, the second sub-pixel, and the fourth sub-pixel to the third sub-pixel is less than 6%, and the crosstalk rate of the first sub-pixel, the second sub-pixel, and the third sub-pixel to the fourth sub-pixel is less than 6%.

According to the Table 1, when the first distance H is within the range of 510 µm to 550 µm, and the length O of the slit 102*a* in the slit grating 102 along the first direction S is within the range of 3 µm to 5 µm, the crosstalk rate is substantially less than 6%. Therefore, in the embodiments of the present disclosure, the first distance H may range from 510 µm to 550 µm, and the length O of the slit 102*a* along the first direction S may range from 3 µm to 5 µm.

In the embodiments of the present disclosure, referring to Table 1, a width of a projection of the ray incident to the pupil that is emitted by each pixel island 10111 may further be acquired in simulation, and the crosstalk rate is negatively correlated with the width of the projection. That is, in the case that the width of the projection is larger, the crosstalk rate between the sub-pixels 101111 is less. In the case that the width of the projection is smaller, the crosstalk rate between the sub-pixels 101111 is greater.

For example, assuming that the length O of the slit 102*a* along the first direction S is 3 µm and the first distance H is 510 µm, the width of the projection of the pixel island 10111 is 2.92 mm according to Table 1.

In the embodiments of the present disclosure, parameters determined based on the formulas and the crosstalk rate are shown in Table 2. Referring to Table 2, assuming that the length y of each pixel island 10111 along the first direction S is 54.9 µm, the length g of the non-light emitting region between two adjacent pixel island groups 1011 along the first direction S is 20 µm, and the number N of sub-pixels 101111 in each pixel island 10111 is four, the first distance H may range from 510 µm to 550 µm, the distance D between each two adjacent slits 102*a* in the slit grating 102 may be 54.229 µm, and the length O of each slit 102*a* along the first direction S may range from 3 µm to 5 µm.

TABLE 2

| Parameter | Parameter value | Parameter | Parameter value |
|---|---|---|---|
| y | 54.9 µm | H | 510 µm to 550 µm |
| g | 20 µm | D | 54.229 µm |
| N | 4 | O | 3 µm to 5 µm |

In the embodiments of the present disclosure, the display effect of the wearable display device 10 may be evaluated by the number of rays incident to the eyes after the rays emitted by the pixel islands 10111 in the display panel 101 pass through the slits 102*a* of the slit grating 102. In the case that the number of rays incident to the eyes is greater, the display effect of the wearable display device 10 is greater. In the case that the number of rays is less, the display effect of the wearable display device 10 is more poor.

For example, assuming that a ratio of the number of pixel islands 10111 of the display panel 101 along the first direction S to the number of pixel islands 10111 of the display panel 101 along the second direction R is U, and the length of each pixel island 10111 along the second direction R is x, a number M of the rays incident to the eyes that are emitted by pixel islands 10111 in an area of 1 inch in the display panel 101 satisfies:

$$M = \frac{N \times 25.4^2 \times \sin(\arctan U) \times \cos(\arctan U)}{x \times y}. \quad \text{formula (10)}$$

The area of 1 inch refers to a rectangular area with a diagonal length of 25.4 mm, and 25.4×sin(arctan U) and 25.4×cos(arctan U) refer to a length and a width of the rectangular area, respectively. Referring to the formula (10), M is used to represent the number of sub-pixels 101111 in the area of 1 inch in the display panel 101, and the number of sub-pixels may be used to represent the number of rays incident to the eyes that are emitted by pixel islands 10111 in the area of 1 inch. That is, M in the formula (10) may represent the number of rays incident to the eyes that are emitted by pixel islands 10111 in the area of 1 inch.

For example, assuming that U is equal to %16 and x is equal to 36.6 µm, M=548790 may be acquired by substituting the parameters in Table 2 into the formula (10).

Figure 14:
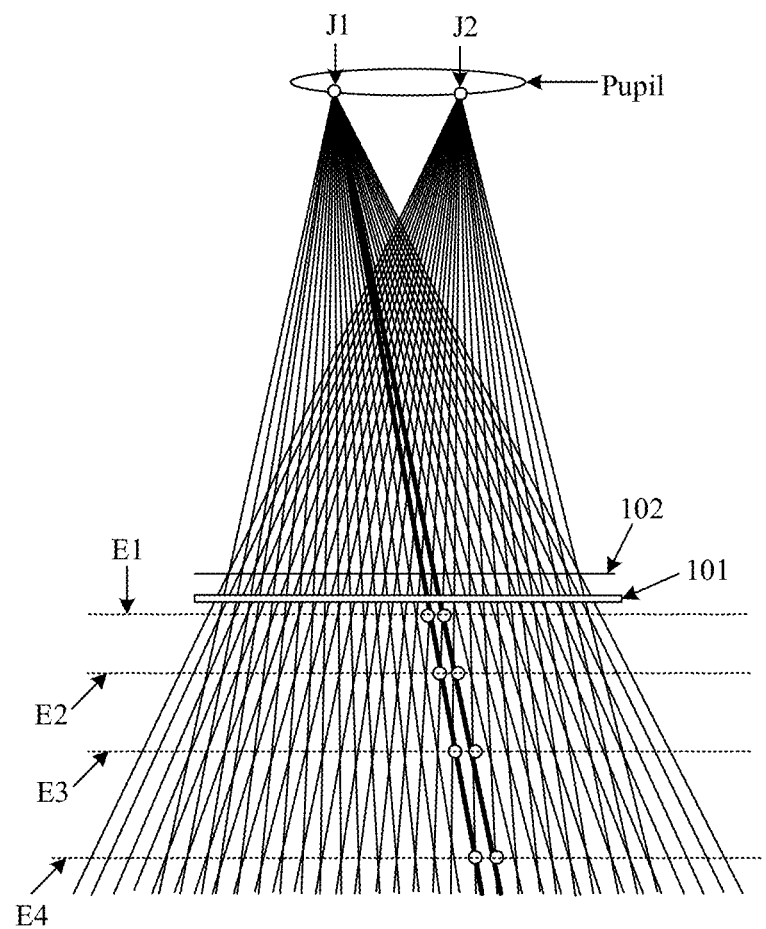
FIG. 14 is another schematic diagram of a plurality of rays incident to a pupil according to an embodiment of the present disclosure.

Referring to FIG. 14, after passing through the slit grating 102, the plurality of rays emitted by the pixel islands 10111 focus into two focus points (J1 and J2) at the eyes. As the rays emitted by the corresponding sub-pixels 101111 in the pixel island 10111 in the display panel 101 are all incident to the same position of the eye, after the plurality of rays emitted by the pixel islands 10111 pass through the slit grating 102, the number of focus points of the plurality of rays emitted by the pixel islands 10111 that focus at the eyes is equal to the number of sub-pixels in the pixel island 10111 in the display panel 101. Thus, each pixel island 10111 in the display panel 101 shown in FIG. 14 includes two sub-pixels 101111.

Figure 15:
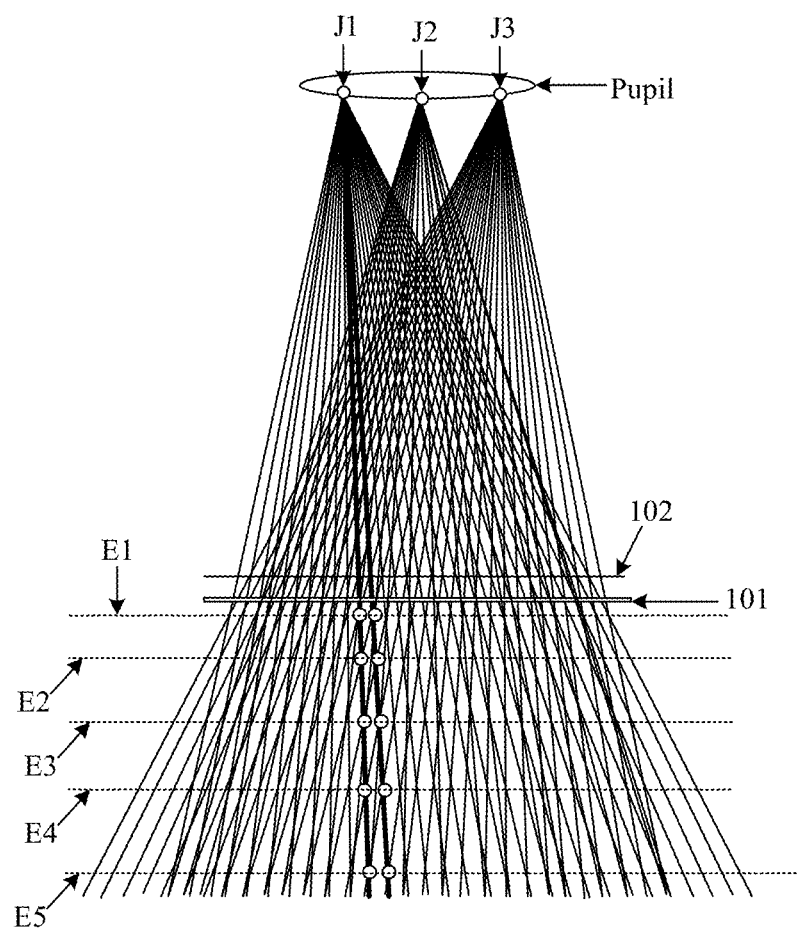
FIG. 15 is yet another schematic diagram of a plurality of rays incident to a pupil according to an embodiment of the present disclosure.

Referring to FIG. 15, the plurality of rays emitted by the pixel islands 10111 focus into three focus points (J1, J2, and J3) at the eyes after passing through the slit grating 102, which means that each pixel island 10111 in the display panel 101 shown in FIG. 15 includes three sub-pixels 101111.

In conjunction with FIG. 14 and FIG. 15, it can be seen that when the pixel island 10111 includes three sub-pixels 101111, the number of imaging faces of the wearable display device 10 is greater (for example, five imaging faces are shown in FIG. 15, that is, E1, E2, E3, E4, and E5). When the pixel island 10111 includes two sub-pixels 101111, the number of imaging faces of the wearable display device 10 is less (for example, four imaging faces are shown in FIG. 14, that is, E1, E2, E3, and E4). Thus, it may be seen that the number of imaging faces of the wearable display device 10 is greater in the case that the number of sub-pixels 101111 in the pixel island 10111 is greater.

In the embodiments of the present disclosure, referring to FIG. 14 and FIG. 15, after the rays emitted by the sub-pixels 101111 pass through the slit 102*a*, included angles between the rays emitted by the sub-pixels 101111 at corresponding positions of each two adjacent pixel islands 10111 are a fixed value, and the included angles are the angular resolution of the imaging face. Therefore, in order to easily measure the resolution of the imaging face, the angular resolution may be used to determine the resolution of the wearable display device 10, and the angular resolution β of the imaging face of the wearable display device 10 may satisfy:

$$\beta = \frac{D}{L} \times \frac{180}{\pi} \times 60.$$

Formula (11)

Referring to the formula (11), the angular resolution β of the imaging face of the wearable display device 10 is positively correlated with the distance D between each two adjacent slits 102*a* in the slit grating 102, and is negatively correlated with the distance L between the slit grating 102 and the viewing face. When substituting the parameters in Table 2 into the formula (11), the angular resolution β of the imaging face of the wearable display device 10 may be equal to 6.29'.

In order to facilitate checking the parameters of each device in the wearable display device according to the embodiments of the present disclosure, the parameters of each device in the wearable display device are listed in Table 3. In Table 3, the length y of each pixel island 10111 along the first direction S is 54.9 µm; the length x of each pixel island 10111 along the second direction R is 36.6 µm; the length g of the non-light emitting region between two adjacent pixel island groups 1011 along the first direction S is 20 µm; the number N of sub-pixels 101111 in each pixel island 10111 is 4; the first distance H ranges from 510 µm to 550 µm; the second distance L is 29.628 mm; the distance D between each two adjacent slits 102*a* in the slit grating 102 is 54.229 µm; the length O of the slit 102*a* along the first direction S ranges from 3 µm to 5 µm; the angular resolution β is 6.29'; the number M of rays incident to the eyes that are emitted by the pixel islands 10111 of the display panel 101 per inch area is 548790; and the crosstalk rate between sub-pixels 101111 is less than 6%.

TABLE 3

| Parameter | Parameter value | Parameter | Parameter value | Parameter | Parameter value |
|---|---|---|---|---|---|
| y | 54.9 µm | H | 510 µm to 550 µm | L | 29.628 mm |
| x | 36.6 µm | D | 54.229 µm | β | 6.29' |
| g | 20 µm | O | 3 µm to 5 µm | M | 548790 |
| N | 4 | | | Crosstalk rate | <6% |

Figure 16:
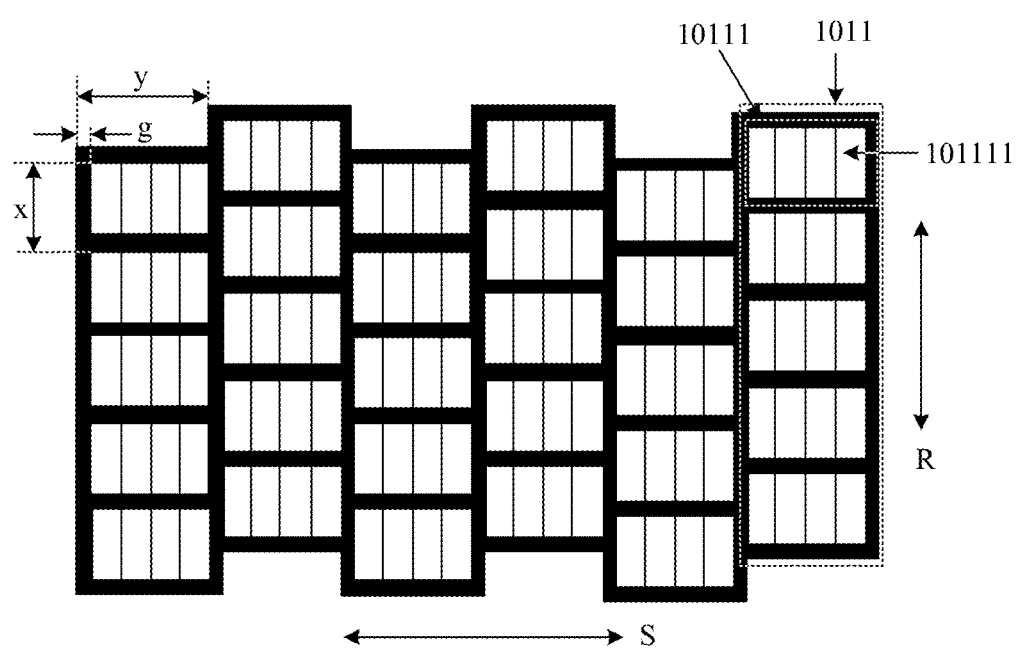
FIG. 16 is a schematic diagram of another display panel according to an embodiment of the present disclosure.

In the embodiments of the present disclosure, the second direction R may be perpendicular to the first direction S. Referring to FIG. 5, the boundary lines of the plurality of pixel island groups 1011 extending along the first direction S may be collinear. That is, the plurality of pixel islands 10111 in the display panel 101 may be arranged in an array. Alternatively, referring to FIG. 16, the boundary lines of the plurality of pixel island groups 1011 along the first direction S may not be collinear. That is, the plurality of pixel islands 10111 in the display panel 101 may be staggered. The embodiments of the present disclosure do not limit the arrangement of the plurality of pixel islands 10111.

Referring to FIG. 11, it can be seen that the wearable display device 10 may further include: a protective layer 104, and an adhesive layer 105. The protective layer 104 may be disposed on a side, distal from the display panel 101, of the slit grating 102, and the protective layer 104 may be configured to prevent other devices in the wearable display device 10 from damaging the slit grating 102, thereby ensuring the display effect of the wearable display device. In addition, referring to FIG. 11, the display panel 101 may further include a backplane 1012. The plurality of pixel island groups 1011 may be disposed on a side, proximal to the slit grating 102, of the backplane 1012. The adhesive layer 105 may be disposed between the display panel 101 and the glass substrate 103 to adhere the glass substrate 103 to a side of the display panel 101.

As the distance H between the display panel 101 and the slit grating 102 ranges from 510 µm to 550 µm based on the above calculation, and the thickness of the glass substrate 103 is 500 μm, a sum of thicknesses of the adhesive layer 105 and the pixel island group 1011 ranges from 10 microns to 50 microns.

In the embodiments of the present disclosure, the plurality of pixel islands 10111 may include: a red (R) pixel island 10111, a green (G) pixel island 10111, and a blue (B) pixel island 10111. Colors of rays emitted by the plurality of sub-pixels 101111 in the red pixel island 10111 are red, colors of rays emitted by the plurality of sub-pixels 101111 in the green pixel island 10111 are green, and colors of rays emitted by the plurality of sub-pixels 101111 in the blue pixel island 10111 are blue.

In summary, the embodiments of the present disclosure provide a wearable display device including a display panel, and a slit grating disposed on a light-emitting side of the display panel. Rays emitted by sub-pixels in the display panel may be exited from slits in the slit grating. In addition, as the rays emitted by the sub-pixels may be intersected after passing through the slits, the wearable display device may include at least two imaging faces. In this way, focus points of two eyes of a user are the same point on an imaging face of the at least two imaging faces by the lens focusing function of the two eyes of the user when the two eyes of the user focus on the certain imaging face of the at least two imaging faces, such that visual fatigue of the user can be avoided, and a display effect of the wearable display device is great.

Described above are only optional embodiments of the present disclosure, and are not intended to limit the present disclosure. Any modifications, equivalent replacements, improvements, and the like made within the spirit and principles of the present disclosure shall be included in the protection scope of the present disclosure.

What is claimed is:

1. A wearable display device, comprising:
   a display panel comprising a plurality of pixel island groups arranged along a first direction, wherein each of the plurality of pixel island groups comprises a plurality of pixel islands arranged along a second direction, each of the plurality of pixel islands comprising a plurality of sub-pixels arranged along the first direction; and the second direction is intersected with the first direction; and
   a slit grating disposed on a light-exiting side of the display panel, wherein the slit grating comprises a plurality of slits arranged along the first direction and extending along the second direction, each of the slits being configured to exit rays emitted by the sub-pixels in at least one of the plurality of pixel island groups,
   wherein a distance W between the display panel and a viewing face satisfies:

$$W \le \frac{y-g}{2\tan\left(\frac{N}{120}\right)^\circ};$$

wherein y represents a length of each of the pixel islands along the first direction, g represents a length of a non-light emitting region between two adjacent pixel island groups along the first direction, and N represents a number of sub-pixels in each of the pixel islands; and the viewing face is disposed on a side, distal from the display panel, of the slit grating, and is a face on which eyes of a user wearing the wearable display device are located.

2. The wearable display device according to claim 1, wherein the distance between the display panel and the viewing face is equal to a sum of a first distance and a second distance, wherein the first distance is a distance between the slit grating and the display panel, and the second distance is a distance between the slit grating and the viewing face; and
   a ratio H/L of the first distance H to the second distance L satisfies:
   H/L=n*(y−g)/φ, wherein n represents a refractive index of a medium between the slit grating and the display panel, and φ represents a pupil diameter of the eyes.

3. The wearable display device according to claim 2, wherein the refractive index of the medium between the slit grating and the display panel is 1, and a distance D between each two adjacent slits of the slit grating satisfies: D=L*y/W;
   wherein L represents the distance between the slit grating and the viewing face, y represents the length of each of the pixel islands along the first direction, and W represents the distance between the display panel and the viewing face.

4. The wearable display device according to claim 1, wherein a length of each of the slits along the first direction ranges from 3 microns to 5 microns.

5. The wearable display device according to claim 1, wherein for any sub-pixel in the plurality of sub-pixels, a crosstalk rate of other sub-pixels of the plurality of sub-pixels other than the any sub-pixel to the any sub-pixel is less than a crosstalk rate threshold, the crosstalk rate threshold being less than or equal to 6%.

6. The wearable display device according to claim 1, wherein the second direction is perpendicular to the first direction; and boundary lines of the plurality of pixel island groups extending along the first direction are collinear, or the boundary lines of the plurality of pixel island groups extending along the first direction are not collinear.

7. The wearable display device according to claim 1, wherein an orthographic projection of an axis, extending along the second direction, of the slit grating on the display panel is coincident with an axis, extending along the second direction, of the display panel.

8. The wearable display device according to claim 1, wherein a number of the slits in the slit grating is greater than or equal to a number of the pixel island groups in the display panel.

9. The wearable display device according to claim 1, further comprising: a protective layer;
   wherein the protective layer is disposed on a side, distal from the display panel, of the slit grating.

10. The wearable display device according to claim 1, wherein the display panel further comprises: a backplane;
    wherein the plurality of pixel island groups are disposed on a side, proximal to the slit grating, of the backplane.

11. The wearable display device according to claim 1, further comprising: a glass substrate;
    wherein the glass substrate is disposed between the display panel and the slit grating.

12. The wearable display device according to claim 11, wherein a thickness of the glass substrate is 500 microns.

13. The wearable display device according to claim 11, further comprising: an adhesive layer;
    wherein the adhesive layer is disposed between the display panel and the glass substrate.

14. The wearable display device according to claim 13, wherein a sum of thicknesses of the adhesive layer and the pixel island group ranges from 10 microns to 50 microns.

15. The wearable display device according to claim 1, wherein the plurality of pixel islands comprise: a red pixel island, a green pixel island, and a blue pixel island;

wherein colors of rays emitted by a plurality of sub-pixels in the red pixel island are red, colors of rays emitted by a plurality of sub-pixels in the green pixel island are green, and colors of rays emitted by a plurality of sub-pixels in the blue pixel island are blue.

\* \* \* \* \*